United States Patent
Rantze et al.

(10) Patent No.: US 6,744,938 B1
(45) Date of Patent: Jun. 1, 2004

(54) RETAIL TERMINAL UTILIZING AN IMAGING SCANNER FOR PRODUCT ATTRIBUTE IDENTIFICATION AND CONSUMER INTERACTIVE QUERYING

(75) Inventors: Edward G. Rantze, Lawrenceville, GA (US); Joseph M. Lindacher, Duluth, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/519,656

(22) Filed: Mar. 6, 2000

(51) Int. Cl.$^7$ .................................................. G06K 9/20
(52) U.S. Cl. ......................................... 382/312; 705/27
(58) Field of Search ................................. 382/312, 313, 382/321; 235/462.25, 462.45, 462.01, 375; 707/3, 4, 5, 1; 705/1–3, 7, 27

(56) References Cited

U.S. PATENT DOCUMENTS

| | | | |
|---|---|---|---|
| 3,949,363 A | 4/1976 | Holm .................. 340/146.3 D |
| 4,408,344 A | 10/1983 | McWaters et al. ............ 382/62 |
| 4,538,072 A | 8/1985 | Immler et al. ............... 250/568 |
| 4,542,528 A | 9/1985 | Sanner et al. .................. 382/62 |
| 4,975,948 A | 12/1990 | Andresen et al. ............ 379/355 |
| 5,428,692 A | 6/1995 | Kuehl ......................... 382/204 |
| 5,465,309 A | 11/1995 | Johnson ....................... 382/229 |
| 5,489,773 A | * 2/1996 | Kumar ......................... 235/462 |
| 5,563,958 A | 10/1996 | Higgins et al. .............. 382/183 |
| 5,581,064 A | 12/1996 | Riley et al. .................. 235/383 |
| 5,602,377 A | * 2/1997 | Beller et al. ................. 235/462 |
| 5,770,841 A | 6/1998 | Moed et al. ................. 235/375 |
| 5,880,451 A | 3/1999 | Smith et al. ................. 235/462 |
| 5,889,897 A | 3/1999 | Medina ....................... 382/310 |
| 6,318,631 B1 | * 11/2001 | Halperin ..................... 235/383 |
| 6,340,115 B1 | * 1/2002 | Swartz .................. 235/462.45 |

\* cited by examiner

Primary Examiner—Yon J. Couso
(74) Attorney, Agent, or Firm—Maginot, Moore & Beck LLP

(57) ABSTRACT

The present invention provides a system, method and apparatus for identifying a product through reading of the product label by a retail terminal. The product/product label is scanned by an imager of a retail terminal. An attribute recognition program such as an optical character recognition (OCR) program is used on the scanned product label which generates text strings from alphanumeric label information and graphics maps/images from graphics/logos. Text strings and/or graphics data are then compared to various text strings and graphics data in a database or look-up table to return information relative to the scanned text string(s)/graphic(s). In one form, kiosks, incorporating an imager and the necessary hardware and software to scan a product label and process the scanned information in accordance with the present principles, may provide printouts of product information, instructions, order forms or the like for the scanned product. Additionally, standard queries or user-generated queries may be answered relative to the scanned product label. Data, stored either locally or at a remote site accessible via a network or the like, is correlated to a plurality of text strings/graphics that correspond to alphanumeric text/graphics on a plurality of product labels.

24 Claims, 5 Drawing Sheets

RETAIL TERMINAL UTILIZING AN IMAGING SCANNER FOR PRODUCT ATTRIBUTE IDENTIFICATION AND CONSUMER INTERACTIVE QUERYING

FIELD OF THE INVENTION

The present invention relates generally to retail terminals and, more particularly, to a retail terminal utilizing an imaging scanner and optical character recognition for product label reading.

DESCRIPTION OF THE PRIOR ART

In the retail industry, a number of electronic retail terminals are used throughout a retail store. For example, the retail store may include a number of point-of-sale (POS) terminals such as traditional assisted (i.e. clerk-operated) checkout terminals. In addition to assisted point-of-sale terminals, the retail store may also include a number of unassisted point-of-sale terminals such as self-service checkout terminals. Self-service checkout terminals are retail terminals which are operated by a customer without the assistance of a retail clerk.

Moreover, in addition to point-of-sale terminals, the retail store may also include a number of information retail terminals such as kiosk-type devices. Such information retail terminals are generally located throughout the shopping area of the retail store and are provided to perform various information retail functions such as a product demonstration function (e.g. an audio/video advertisement), a customer data collection function (e.g. collecting and maintaining a customer profile database), and in some cases even a transaction function in which a customer may use the kiosk to tender payment for his or her items for purchase. Information retail terminals may be used to display product information to retail customers, or may be used as an interactive retail terminal which provides assistance to customers in response to a customer's input via a keypad or the like.

In the retail industry, scanners are becoming more and more prevalent, and even commonplace. Traditionally, such scanners are used for scanning or reading bar codes (i.e. Universal Product Codes or UPCs). Bar codes, and thus scanners, are used in many industries for a variety of applications including retail product sales, inventory tracking, package sorting and the like. The problem with traditional scanners is that they can only read linear and stacked-linear bar codes. Imaging scanners or imagers however, can not only be used to read bar codes but can be used to capture images and other pictures. In addition, pressure sensitive imagers are used in the retail industry to capture signatures for credit card purchases and the like.

Essentially, scanners/imagers take a picture of the item then software processes the picture. If the image scanned is a bar code, the software distinguishes the lines of the bar code from the rest of the picture and returns the value of the bar code. Other processing may occur after determining the value of the bar code, such as returning the price of the item associated with the bar code through the aid of a price or product look-up (PLU) table or database. However, there are times when a bar code is not present or cannot be read. Further, the PLU may not provide the information desired. As well, if the image is a picture, the software may typically download the picture and perform whatever function is programmed for the picture.

In the case of a label on a product, the product label includes various useful information other than the bar code. Such label information however, is alphanumeric rather than an image or a bar code. Thus, traditional scanning/imaging and processing techniques cannot be used on product labels. It would be advantageous to be able to read and utilize the alphanumeric information on a product label of a product.

What is therefore needed is a system for identifying information on a label of a product other than the bar code.

What is further needed is a system for identifying information on a label of a product other than the bar code and utilizing at least part of the label information to retrieve answers to user queries relative to the product or label information.

What is even further needed is a system for identifying any attribute of a label or product and utilizing the attribute to obtain and/or retrieve information relative to the attribute.

SUMMARY OF THE INVENTION

In one embodiment, the present invention provides a system, method and apparatus for identifying/utilizing an attribute of a product and/or product label by a retail terminal. The product/product label is scanned by an imager associated with the retail terminal. The retail terminal recognizes or acknowledges a selected attribute of the product/product label and provides information relative to the scanned product/product label.

In one form, a retail terminal includes a processing unit, memory electronically coupled to the processing unit, and an imager electronically coupled to the processing unit. The imager is adapted to scan the product/product label to obtain product attribute data. Instructions, stored in the memory, allow the retail terminal to utilize the product attribute data to obtain correlative information.

The correlative information may be obtained from a database, data warehouse, the internet, or the like. The correlative information may be in response to a user query. The product attribute data may be alphanumeric and/or graphic in nature.

In another embodiment, the present invention is a retail terminal providing a system, method and apparatus for identifying a product attribute by scanning the product label. The product label is scanned by an imager of a retail terminal. An optical character recognition (OCR) program is used on the scanned product label which generates text strings from alphanumeric label information/data. Text strings are then compared to various text strings in a database or look-up table to return information relative to the scanned text string(s).

In one form, kiosks, incorporating an imager and the necessary hardware and software to scan a product label and process the scanned information in accordance with the present principles, may provide printouts of product information, instructions, order forms or the like for the scanned product. Additionally, standard queries or user-generated queries may be answered relative to the scanned product label. Data, stored either locally or at a remote site accessible via a network or the like, is correlated to a plurality of text strings that correspond to alphanumeric text on a plurality of product labels.

Implementations of the present invention, without being exhaustive, include locating products having similar ingredients as the product scanned, determining the location of the product in the store from a scanned label, determining whether the store carries the same or similar products to the product scanned, determining whether there is a coupon available for the scanned product, and/or determining what products, if any, are made by the manufacturer of the scanned product.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set forth herein illustrates one preferred embodiment of the invention, in one form, and such exemplification is not to be construed as limiting the scope of the invention in any manner.

DETAILED DESCRIPTION

Figure 1:
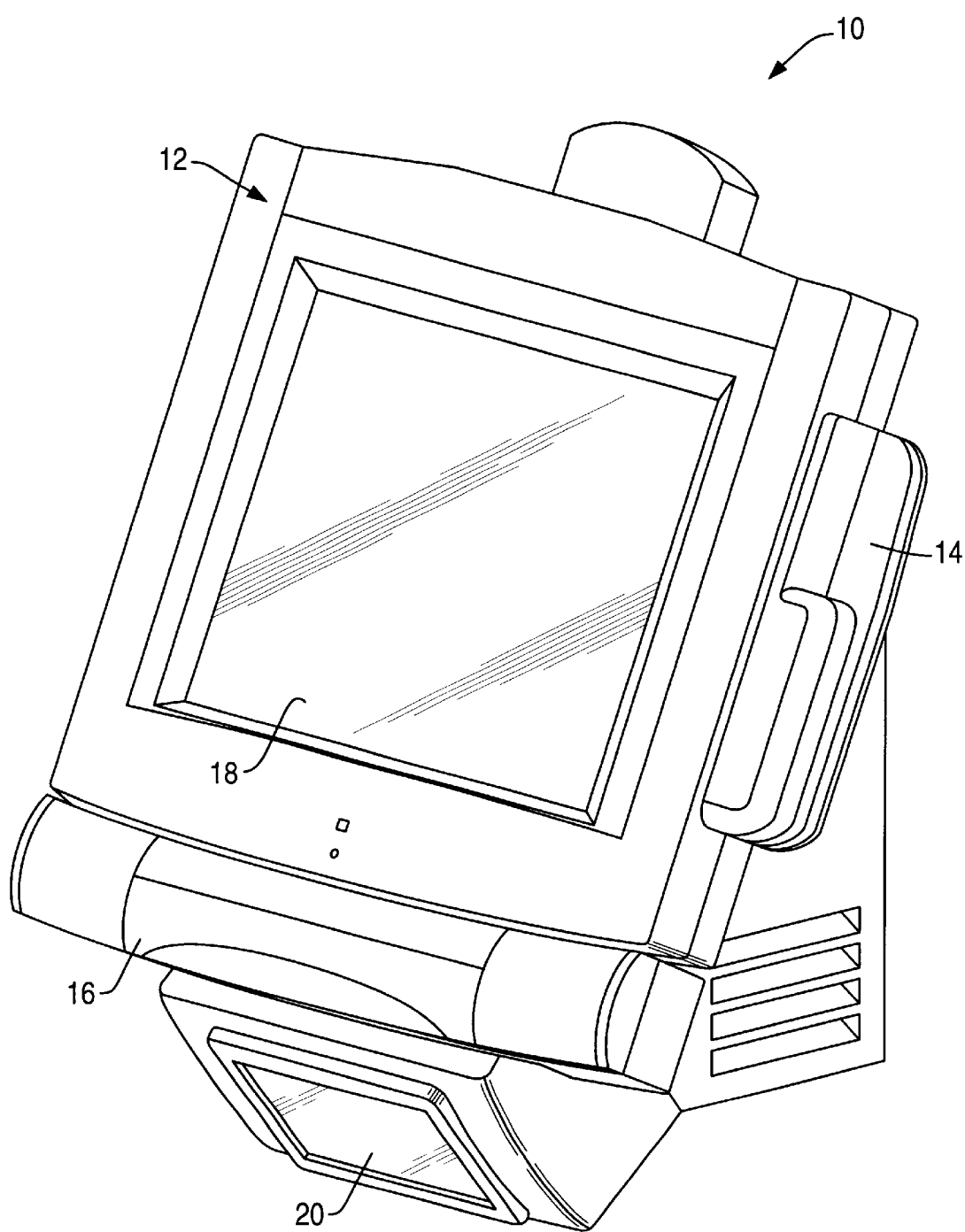
FIG. 1 is a front perspective view of a retail terminal embodying the present invention.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the appended claims.

With reference now to FIG. 1, there is shown a retail terminal generally designated 10. The retail terminal 10 may be what is known as a kiosk, or may be any type of similar terminal as is known in the art, and is depicted in FIG. 1 as a stand alone device. The retail terminal 10 is preferably of a consumer interactive type but not necessarily so. As such, the retail terminal 10 may be configured to perform a number of retail functions such as (i) a point-of-sale (POS) retail function, (ii) a product demonstration retail function, (iii) a data collection function, (iv) a passive display function, and/or (v) an interactive, consumer query and answer function or the like. Hereinafter, the retail terminal 10 may be referred to as a kiosk but consistent with the above should be understood to include all types of retail terminals and consumer interactive terminals. The retail terminal 10 may be utilized to perform either assisted or unassisted retail/interactive functions during an active or power-up mode.

The retail terminal 10 includes a housing 12 that supports a display or monitor 18 for showing video or individual frames or screens depending on the particular mode of use. The display 18 preferably incorporates a touch-screen 19 (see FIG. 4) as is known in the art. Commonly, such displays are of the LCD type. The retail terminal 10 also preferably includes a card reader 14 as is known in the art for obtaining information from a magnetic strip type card. As well, the card reader 14 may be a smart card reader. While not specifically depicted, the retail terminal 10 may include both types of card readers or a card reader that integrates both functions and more.

Additionally, the retail terminal 10 includes a speaker assembly 16 that is preferably a stereo speaker assembly. Further, the retail terminal 10 includes a scanner or imager 20 that is positioned to allow the scanning or imaging of a product and/or product label brought in proximity thereto. The scanner 20 may be any type of scanner or imager as is known in the art that is capable of capturing or imaging alphanumeric characters from a product and/or product label as well as a bar code and picture or graphics. Such a scanner/imager may be a laser type scanner, an LED type scanner, combination thereof, and the like.

The retail terminal 10 shown in FIG. 1 may have other components as are typical or atypical of retail terminals, while not specifically mentioned herein. These other components are generally known in the art. Additionally, the retail terminal 10 may be locatable anywhere either as a stand-alone self-contained unit, or as coupled to a network as a networked stand-alone terminal or workstation type unit. The principles of the present invention may likewise be incorporated into an existing retail unit/system.

Figure 2:
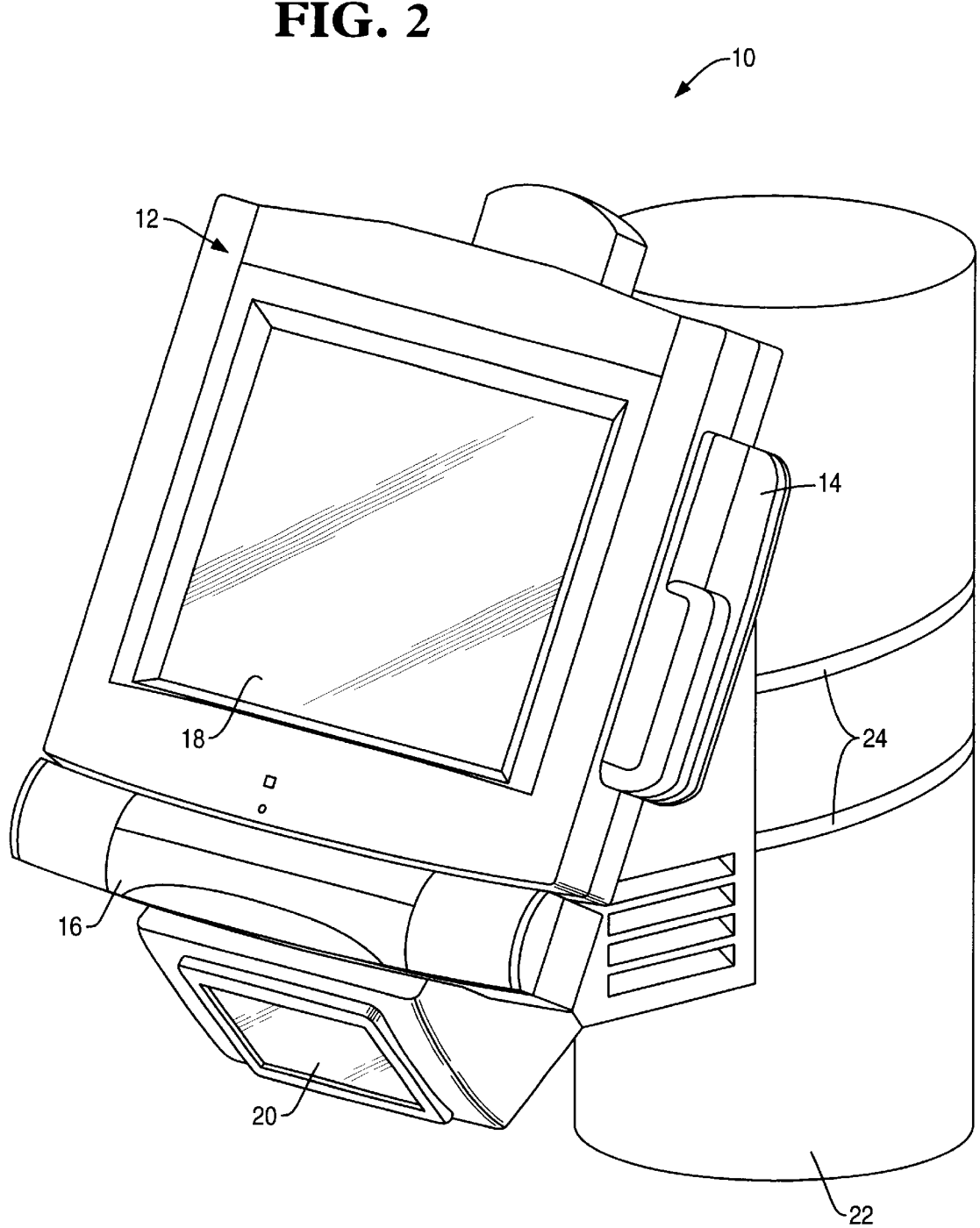
FIG. 2 is a front perspective view of a retail terminal embodying the present invention mounted to a post.
Figure 3:
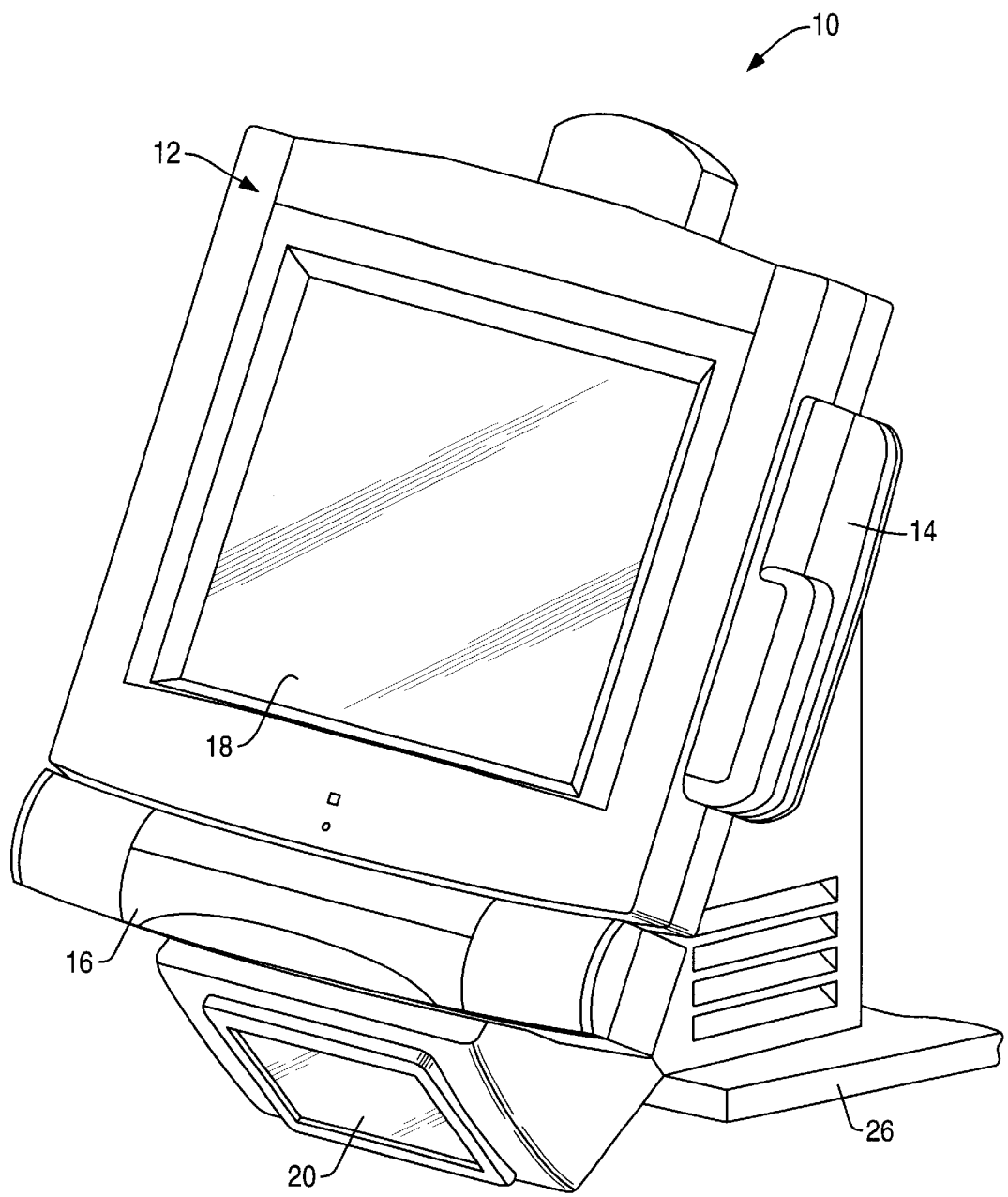
FIG. 3 is a front perspective view of a retail terminal embodying the present invention on a stand.

With reference to FIG. 2 there is depicted retail terminal 10 attached to a post or column 22 by mounting bands 24. The post 22 is typically a support column located at a point within a store, warehouse or the like. In FIG. 3, the retail terminal 10 includes a stand 26 that allows the retail terminal 10 to rest upon a table or other surface. The retail terminal depicted in FIGS. 1–3 may be understood in greater detail with regard to various options and their functionality by reference to allowed U.S. patent application Ser. No. 09/070, 619 filed Apr. 30, 1998 by Nugent et al. entitled Retail Terminal & Associated Mounting Method which is specifically incorporated by reference herein. It should be appreciated that it is not necessary for the present invention to be a stand alone unit such as a kiosk, but may be incorporated into or associated with or be within a larger system.

Figure 4:
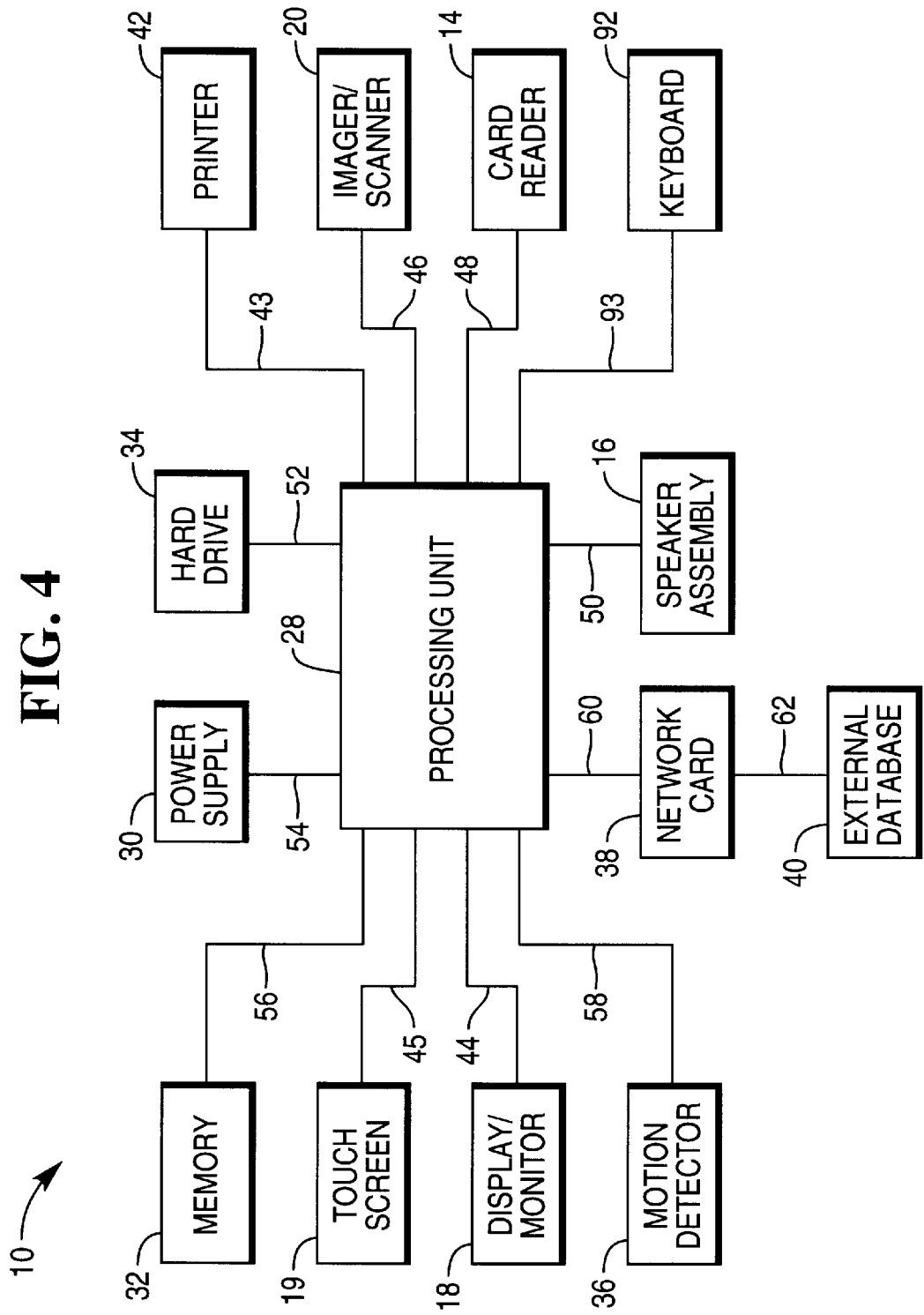
FIG. 4 is a block diagram of various components of the retail terminals of FIGS. 1–3.

Referring now to FIG. 4, there is depicted a block diagram of the various components of the retail terminal 10. It should be understood that some components may be internal to the housing 12 of the retail terminal 10 and thus not depicted in FIGS. 1–3. As well, other components depicted in FIG. 4 may not be shown in FIGS. 1–3.

The retail terminal 10 includes a processing unit or circuitry 28 as is known in the art that is in electronic communication with a typical power supply 30 via a power line 54. The power supply 30 is coupled to a source of electricity (not shown) as is known in the art and is transformed appropriately for use by the processing unit 28 and any other devices as necessary. The card reader 14 is electronically coupled to the processing unit 28 via a communication line 48 that allows communication between the processing unit 28 and the card reader 14. Information from a user's card is accessed and/or used by the processing unit 28. This may occur during ordering of a product and/or payment thereof, the retrieving of information, or for gaining access to the system or the like.

The display/monitor 18 is likewise electronically coupled to the processing unit 28 via a communication line 44 that allows communication between the processing unit 28 and the display/monitor 18. The display/monitor 18 is used to visually show various options and/or choices that allow user/consumer interaction through the touch-screen 19 in electronic communication with the processing unit via a communication line 45. As well, any type of video or single frame screens may be shown, or a combination thereof. The video may include predefined textual queries or textual answers in response to any type of query. Additionally, the speaker assembly 16 is likewise electronically coupled to the processing unit 28 via a communication line 50 that allows audio information (stereo or mono) to pass to the speakers. The audio information may be music, discourse, or a combination of music and discourse. Such audio may be instructions, or answers to queries.

Further, an imager 20 is electronically coupled to the processing unit 28 via a communication line 46 that allows communication between the processing unit 28 and the imager 20. The imager 20 is used to obtain a scan or image of a product/product label and its bar code, alphanumeric text, and/or pictures and graphics, collectively product attributes or product attribute data. In order to accomplish a scan of the product, the consumer may manually move the product thereunder or such may be accomplished automatically as in known in the art. In any case, the entire product/product label may not need to be scanned depending on the user query. It may be necessary to only obtain certain information or attributes of the product, while at other times all of the attributes or information may need to be obtained.

In one form, scanning may take place after the user query where only certain information needs to be obtained. Entire product scanning, however, is preferred since it may not be known where the requisite information or attribute is located on the product or product label, or what the user query will be. Further, after scanning, multiple user queries may be ascertained and answered from the label. As well, multiple products may be consecutively scanned and stored prior to user query, or a product scan per query. Various combinations are possible.

The retail terminal 10 may include a motion detector 36 that would be electronically coupled to the processing unit 28 via a communications line 58. The motion detector 36 can be used to detect whether a customer is within a detection zone in order to allow the retail terminal 10 to perform an action or enter into a certain mode of operation.

The retail terminal 10 may include a hard drive 34 or other similar local or internal storage device that is in electronic communication with the processing unit 28 via communication line 52. The hard drive 34 may be used to store a database or array of text strings of a plurality of information contained on a plurality of product labels. Such information could include, without being exhaustive, ingredients, manufacturer and manufacturer data, nutrition facts, instructions, coupons, advertising matter, weight/volume, and contents. Information or attribute data that can be associated with the various text strings of the product labels are likewise stored. Such associated information could include, without being exhaustive, price, product location, similar products, and the like. Attribute data may be graphics, tables, associations, etc. which are, as well, stored in a database or otherwise. Various associations or association programs, tables, and/or databases can be used to provide the correspondence or cross-correlation necessary to accomplish the present invention.

The processing unit 28 may be in communication with a memory device (or devices) 32 such as RAM or ROM via communication line 56 that, as well, may be used to temporarily or permanently store text strings, graphics, associations, program/program instructions and other information. The hard drive 34 also stores program information (programs/instructions) for the operation of the retail terminal and its components as described herein. An optical character recognition (OCR) program as is known in the art is also stored that is used on the scanned image/product label to generate text strings from the alphanumeric information on the label. Other program instructions required to carry out the various functions as described herein are also stored. This includes graphics recognition programs and other data recognition type programs.

A network card 38, modem or the like (collectively network card) may be installed in the retail terminal 10 that is in electronic communication with the processing unit 28 via a communication line 60. The network card 38 allows the connection of the retail terminal 10 to an external database 40 via a dedicated line, telephone line 62 or the like as is known in the art. The external database 40 may be a data warehouse that contains text strings corresponding to the various types of information on the various product labels as enumerated above, or that contains graphics corresponding to the various types of product attribute data on the various products. As well, the external database may contain other product attribute data or information regarding various products cross-referenced with respect to the various text strings, graphics and/or the like. The external database 40 may be accessed via the internet, a LAN or WAN, or the like, and may be in addition to local or internal databases or to the exclusion thereof. The external database 40 may be the internet.

The retail terminal 10 may be in electronic communication with a printer 42 via a communication line 43 for providing a printout or hard copy of retrieved information or data that is generally in response to queries by a consumer/user and/or as a result of the scanning of a label of a product. While not shown in FIGS. 1–3, the retail terminal 10 may include a keyboard 92 and/or other input device (e.g. a mouse) that is in electronic communication with the processing unit 28 via a communication line 93. The keyboard 92 may be used in lieu of or in addition to the touch-screen 19 and the display 18 as an additional consumer/user input device. Various queries or choices may be displayed on the display 18 for consumer interaction use of the input device or touch-screen 19 will allow the user/consumer to make those choices.

Figure 5:
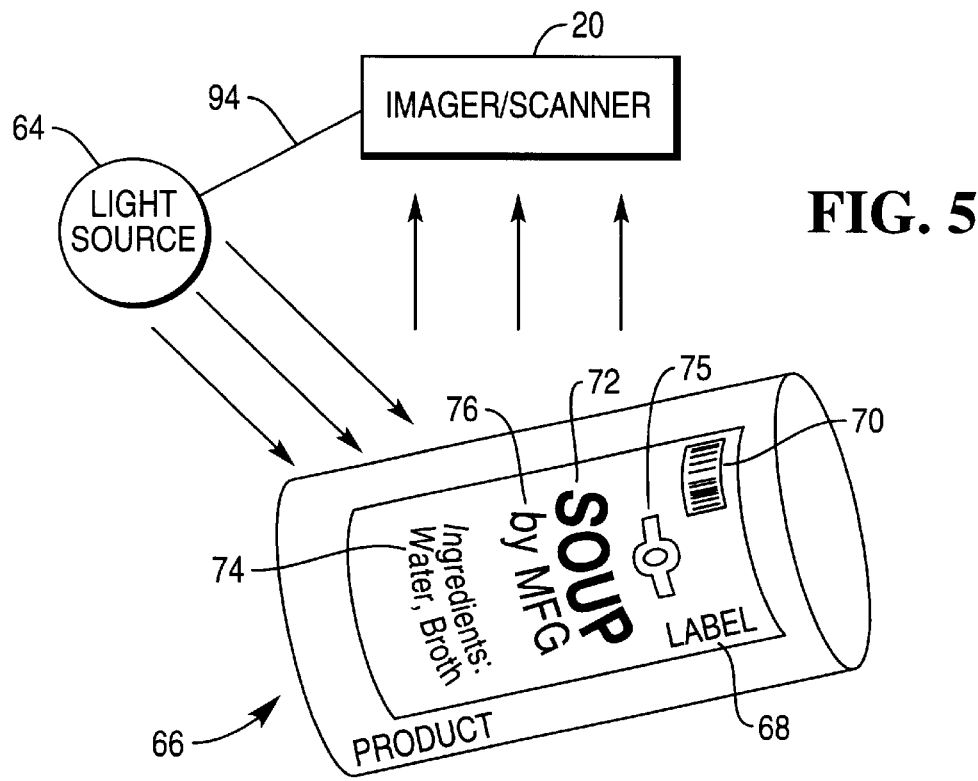
FIG. 5 is a diagrammatic illustration of the scanning/imaging of a product label in accordance with the present invention.
Figure 6:
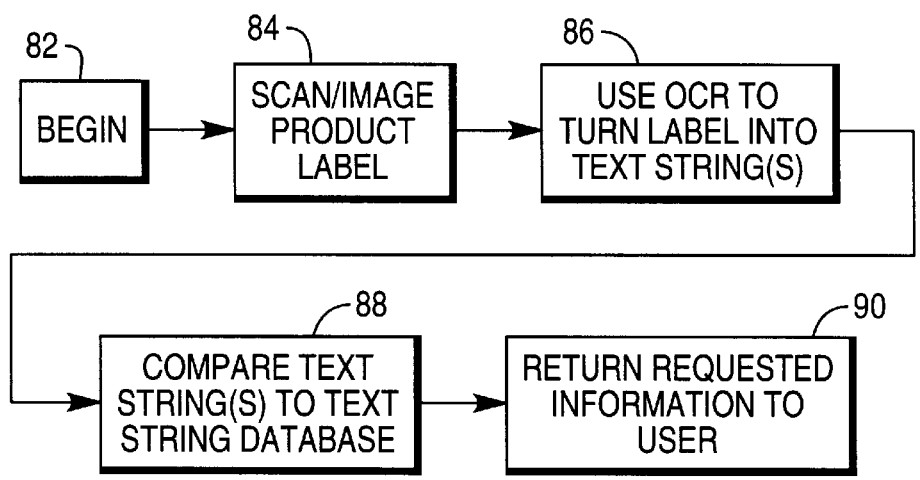
FIG. 6 is a program flowchart of the scanning/imaging of the product label and subsequent processing thereof in accordance with the present invention.

A specific example of the operation of the retail terminal 10, without being exhaustive, will be set forth in accordance with the principles of the present invention in conjunction with FIGS. 5 and 6. With specific reference to FIG. 5, there is shown a product 66 being scanned or imaged by scanner/imager 20 of the retail terminal 10 as a result of manually placing the product 66 proximate the scanner/imager 20 or automatically placed proximate the scanner/imager 20. An external light source 64 is shown in electronic communication with the imager 20 via communication line 94. The external light source 64 may be necessary for image acquisition depending on the type of scanner/imager used.

The scanner/imager 20 obtains a scan or image of the label 68 of a product 66 as is known in the art when the product 66 is brought proximate to the imager 20. It should be appreciated that the label does not necessarily have to be attached to a product. As well, the object scanned may be an advertisement, coupon, or the like. The entire product itself may be scanned, irrespective of its label. A typical product label 68 includes a bar code 70, a name of the product 72, a logo or graphic 75, a manufacturer 76, and an ingredients listing 74, as well as other attribute information/data as enumerated above. The various information on the label 68 is typically predominantly alphanumeric. The label 68 may, however, also have a picture 75 or other graphics.

With specific reference to FIG. 6, there is depicted a program flowchart 80 of steps executed by the retail terminal 10 as the product 66 is brought into proximity to the imager 20. In step 82, the program begins. In step 84, the imager 20 scans the product label 68. After the product label 68 is scanned, in step 86 an attribute recognition program such as an optical character recognition (OCR) program, a graphics recognition program, or a combination of the two attribute recognition programs or the like is executed by the processing unit 28 on the alphanumeric characters and/or graphics (collectively "label or attribute information/data") on the product or product label 68. The attribute recognition program converts the optically scanned label information into a plurality of text strings (or graphics maps as the case may be). In step 88, in accordance with the user query or queries, one or more of the text strings (graphics) of the label are compared to the various stored text strings (graphics). Again, dependent upon the user query or queries typically from the display 18 and touch-screen 19, information associated with the stored text strings are returned. Such associated information can be that enumerated above. Thereafter, in step 90, information or data requested by the user is returned to the retail terminal 10. This information may be displayed on the display 18, printed by the printer 42, and/or audibly reproduced by the speakers 16.

The customer may request various data regarding the product either as preprogrammed queries and selected via the display 18 and touch-screen 19, via the keyboard 92, or other input device, or as user generated queries inputted into the retail terminal 10 by any means.

Exemplary implementations are as follows. If a customer wants to find a product or products that have the same or similar ingredients to the list of ingredients from a product at hand. Once scanned, the ingredients 74 are converted into text strings by the OCR. The text strings of ingredients are then searchable or comparable against stored text strings of ingredients. Once located, the stored text strings of ingredients are linked to other products. Then those other products are returned as an answer to the query.

If a customer wants to find products within the retail store that match the ingredients of the scanned product, the listing of products having the same or similar ingredients may be printed by the printer 42 or displayed on the display 18 after OCR conversion, text string matching/comparison and text string association.

In another instance, a product label is scanned to determine the location of the product within the retail store. The name of the product is converted into a text string by the OCR. The text string is then compared to the text strings in the text string database. When the text string is located in the text string database, product location is determined by product location data associated with the located text string.

It should be understood that in addition to or separately from the above examples, the product packaging or label may be imaged to obtain a graphic or graphics therefrom such as a logo, trademark, color scheme, background, or the like. The graphic(s) may be used to locate similar products having the graphic(s) and/or for any other purpose such as those set forth above. Thus, the present invention is not limited to alphanumeric data, but any product attribute information/data which includes graphics, alphanumeric information, symbols and the like. All of the principles of the present invention set forth herein are applicable to graphics, symbols, and the like in addition to alphanumeric data.

Of course, many other applications are possible by the total reading/scanning/imaging of the product label. Thus the consumer is able to obtain information regarding the scanned object or relative thereto.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A retail terminal comprising:
   an imager;
   a processing unit electronically coupled to said imager; and
   a memory device electronically coupled to said processing unit and said imager, wherein said memory device has stored therein a plurality of instructions which, when executed by said processing unit, causes said processing unit to:
   (a) cause said imager to scan a label of a product;
   (b) convert alphanumeric information on said label into label data;
   (c) compare at least some of the label data to stored data; and
   (d) return information relative to a user query and corresponding to the stored data.

2. The retail terminal of claim 1, wherein said plurality of instructions includes optical character recognition instructions for converting the alphanumeric information on said label data into said label data.

3. The retail terminal of claim 2, wherein the retail terminal includes a display, and the information returned to the user relative to the user query and the compared stored data is shown on said display.

4. The retail terminal of claim 2, further comprising a user interface operable to input a user query.

5. A method of operating a retail terminal, comprising the steps of:
   (a) imaging a product label with an imager;
   (b) converting alphanumeric information on the product label into label data;
   (c) comparing at least some of the label data to stored data on a storage device dependent upon a user query; and
   (d) obtaining data associated with said stored data on said storage device dependent upon said user query.

6. The method of claim 5, wherein the step of converting alphanumeric information on the product label into label data includes utilizing an optical character recognition program.

7. The method of claim 5, wherein the step of obtaining data associated with said stored data on said storage device dependent upon user query includes showing the data on a display.

8. A retail terminal comprising:
   an imaging scanner;
   a processing unit electronically coupled to said imaging scanner; and
   a memory device electronically coupled to said processing unit and said imaging scanner, wherein said memory device has stored therein a plurality of instructions which, when executed by said processing unit, causes said processing unit to:

(a) cause said imaging scanner to scan a product;
(b) convert alphanumeric product information located on said product into product attribute data;
(c) compare the product attribute data to stored product attribute data; and
(d) return information in response to a query that corresponds to the stored product attribute data.

9. The retail terminal of claim 8, wherein said plurality of instructions includes an optical character recognition program for converting the alphanumeric product information into said product attribute data.

10. The retail terminal of claim 9, wherein the retail terminal includes a display, and the information returned to a user relative to the query and the stored product attribute data is shown on said display.

11. The retail terminal of claim 9, wherein said product attribute data includes text strings.

12. The retail terminal of claim 8, wherein said alphanumeric product information consists essentially of: a plurality of symbols, each constituting a unit of an alphabet.

13. The retail terminal of claim 8, wherein said alphanumeric product information consists essentially of: a word represented by a string of alphabetic symbols.

14. The retail terminal of claim 8, wherein said alphanumeric product information consists essentially of: a number of words that describe ingredients contained in said product.

15. The retail terminal of claim 8, wherein said alphanumeric product information consists essentially of: a number of words that describe a manufacturer of said product.

16. The retail terminal of claim 8, wherein said alphanumeric product information consists essentially of: a number of words that describe contents of said product.

17. A method of operating a retail terminal, comprising the steps of:
(a) imaging a product with a scanner;
(b) converting alphanumeric product information located on the product into product attribute data;
(c) comparing at least one of the product attribute data to product attribute data stored on a storage device dependent upon a query; and
(d) obtaining data associated with said product attribute data stored on said storage device dependent upon said query.

18. The method of claim 17, wherein the converting step includes utilizing an optical character recognition program to convert said product information into said product attribute data.

19. The method of claim 17, wherein the step of obtaining data associated with said product attribute data stored on said storage device dependent upon said query includes showing the obtained data on a display.

20. The method of claim 17, wherein said alphanumeric product information consists essentially of: a plurality of symbols, each constituting a unit of an alphabet.

21. The method of claim 17, wherein said alphanumeric product information consists essentially of: a word represented by a string of alphabetic symbols.

22. The method of claim 17, wherein said alphanumeric product information consists essentially of: a number of words that describe ingredients contained in said product.

23. The method of claim 17, wherein said alphanumeric product information consists essentially of: a number of words that describe a manufacturer of said product.

24. The method of claim 17, wherein said alphanumeric product information consists essentially of: a number of words that describe contents of said product.

\* \* \* \* \*